INVENTOR
ANDREW BARK
BY *Elmer J. Gorn*
ATTORNEY

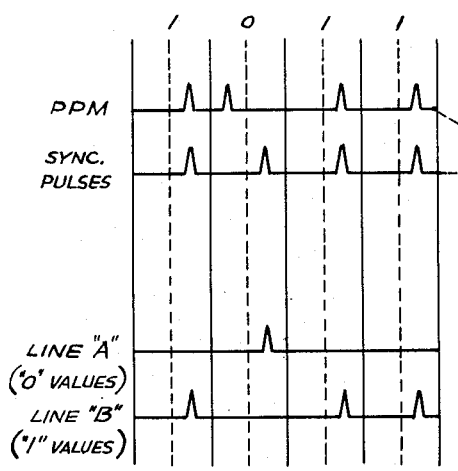
FIG. 4
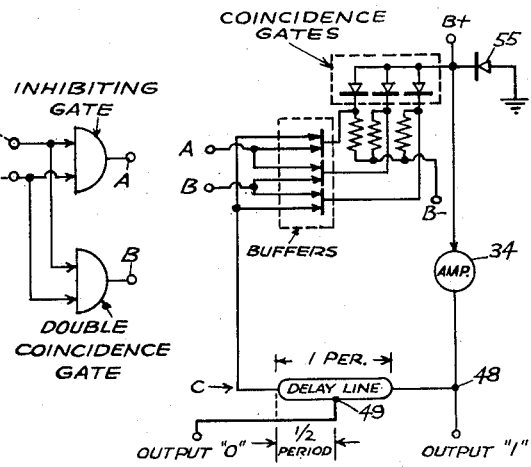
FIG. 9
| CONDITION | SIGNAL LINE | RESET LINE | FEEDBACK LINE | DIODES 38a | 38b | 38c |
|---|---|---|---|---|---|---|
| 1 | ⋏ | — | ⋏ | ▽ | ▼ | ▼ |
| 2 | — | ⋏ | — | ▽ | ▼ | ▼ |
| 3 | ⋏ | — | — | ▼ | ▼ | ▽ |
| 4 | — | ⋏ | ⋏ | ▼ | ▼ | ▽ |
| 5 | ⋏ | ⋏ | — | ▼ | ▽ | ▼ |
| 6 | — | — | ⋏ | ▼ | ▽ | ▼ |
| 7 | ⋏ | ⋏ | ⋏ | ▽ | ▽ | ▽ |
| 8 | — | — | — | ▽ | ▽ | ▽ |
KEY: ▽ --- CONDUCTING
▼ --- CUT OFF
FIG. 10
INVENTOR
ANDREW BARK
BY
ATTORNEY

INVENTOR
ANDREW BARK
BY
ATTORNEY

INVENTOR
ANDREW BARK
BY
ATTORNEY

Dec. 16, 1958 A. BARK 2,865,018
INTELLIGENCE TRANSMISSION
Filed June 25, 1954 6 Sheets-Sheet 6
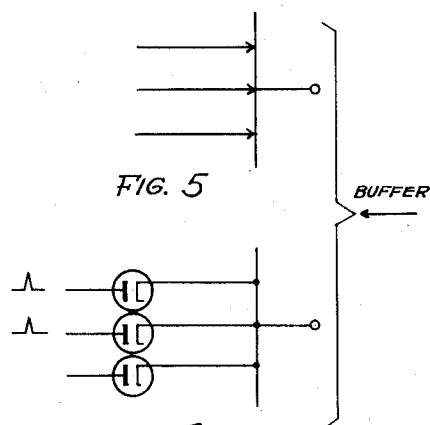
FIG. 5
FIG. 6
BUFFER
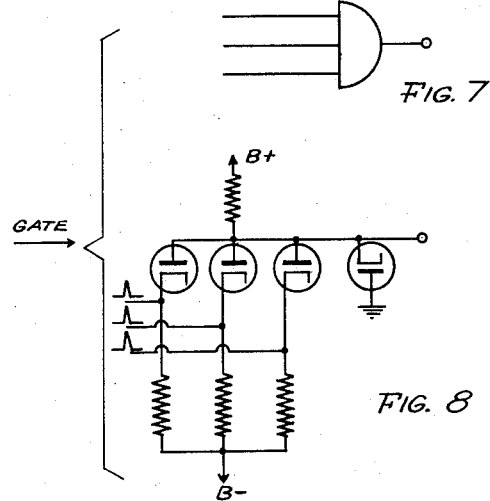
FIG. 7
GATE
FIG. 8
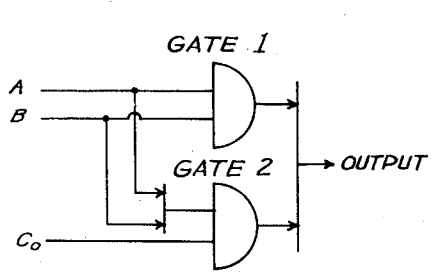
FIG. 14
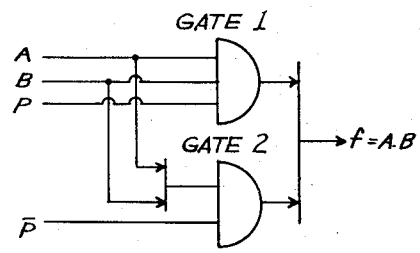
FIG. 15
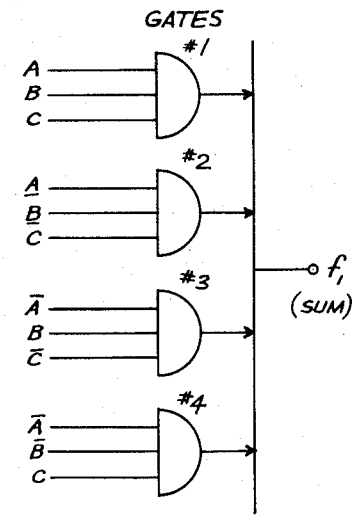
FIG. 16
INVENTOR
ANDREW BARK
BY
ATTORNEY United States Patent Office 2,865,018
Patented Dec. 16, 1958

2,865,018

INTELLIGENCE TRANSMISSION

Andrew Bark, Weston, Mass., assignor to Raytheon Manufacturing Company, Waltham, Mass., a corporation of Delaware Application June 25, 1954, Serial No. 439,400

12 Claims. (Cl. 340—167)

This invention relates to intelligence transmission, and particularly to the representation of informational data in digital form by the use of signal energy controlled in a manner permitting a variety of manipulations to achieve corresponding distinctions in the character of information represented.

In accordance with the present invention, a pulse position modulation system is used in connection with a digital computing system whereby a pulse is received during every time interval constituting a digital period, the significance of the pulse being determined by its location within the particular time interval instead of the previously-used pulse amplitude method of identifying each digit of the system. In pulse position modulation, a pulse occurring during the first portion of a particular interval signifies one particular value, whereas a pulse occurring during a later stage of the time interval signifies a different value. Thus, during any digital period in a pulse position modulation system, there is one and only one pulse in this system, and as herein used in connection with a binary storage unit or similar computer circuit, results in simplification of computer circuit design, a reduction in the number and size of components, and an increase in circuit reliability.

The invention is further generally characterized by the transmission of signal energy in pulse form, and involves selective treatment of the pulse generating and transmitting means to produce gradations in the time positioning of successive pulses in order to indicate correspondingly graded digits in a digital computing system. Thus, for example, when the system is incorporated in apparatus for achieving a digital count in accordance with the binary code, a pulse occupying a predetermined section of a digital space will represent the binary digit "0" while a pulse occupying another section of such digital space will represent the binary digit "1." Thus every space unit becomes a pulse recording unit, and it becomes possible to represent either of the two digital units of the binary code within the compass of a single pulse spacing, so that every spacing is utilized and each successive spacing serves as the medium for the representation of either digit of a two-digit system in contradistinction to prior computing methods which have required elimination of a pulse from certain pulse spacing intervals for representation of at least one of the code units of the system. At this point, it should be noted that the system herein disclosed is also applicable to computing systems employing a larger number of digital representations, including both the tertiary and the decimal systems and systems intermediate the tertiary and the decimal involving the use of any number of digits from three to ten, or beyond. When applied to any system of computing by means of digits, and regardless of the number of digits, the computation method herein disclosed will operate by utilizing each successive pulse spacing interval for the representation of a particular digital unit of the prevailing code, with the relative positions of the representations within the limits of each such spacing interval serving as the key to distinguish each component digit of the code from all of the others.

In high speed electronic digital computers employing the binary code, amplitude modulated signals have heretofore been utilized for representation of the distinguishing digits of the code. In such operations the time intervals between successive pulse representations are subject to wide variations, with a correspondingly wide variation in the pulse amplitude modulating periods. The result of the above-described characteristic of digital computing by the pulse amplitude modulating method (hereinafter referred to as "PAM") is the production of a non-periodic serial train of pulses embracing a relatively wide spectrum of frequencies. This in turn necessitates corresponding complexities in the circuits necessary to the incorporation of such pulse trains, particularly because of the problems involved in the coupling operations as between successive stages of the pulse trains. This is especially true when the amplitude modulated signals represent the two binary digits (1 and 0) in the formulation of coded words constituting the computer data to be transmitted.

The present invention, involving the substitution of pulse position modulation (hereinafter referred to as "PPM") for the amplitude modulation of the prior art, overcomes the disadvantages above described, first by reducing the spread or displacement as between successive pulses representing components of the transmitted data (with a corresponding reduction in the width of the frequency required), and secondly, by the substitution of uniform periodic pulse representations for the randomness of pulse occurrences in the systems of the prior art.

With the pulse position modulation principle of operation as herein disclosed and applied to a pulse storage system, it is possible to present a positive pulse signal for each digital period. This results in a smooth and uniform application of power of constant magnitude for each successive digital period, with a corresponding approach to constancy of frequency. This is indicated by pulse pattern "b" in the diagram designated Fig. 1 constituting one of the drawings forming part of this disclosure as hereinafter pointed out. As shown in said Fig. 1b, the average voltage level is fixed and positive, and is determined by the amplitude. In Figs. 1c and 1d, the average voltage level is of zero magnitude, but in all three patterns (b, c, d) the frequency tends toward constancy.

Features distinguishing PPM computing as herein disclosed include the following:

First, during any digital period there is one and only one pulse representation.

Secondly, regardless of which of the distinguishing pulses is first to appear—that is, a pulse positioned to represent the digit "1" or a pulse positioned to represent the digit "0"—(or some other digit if there are more than two) such pulse may normally appear only at synchronized, evenly spaced periods of time.

Thirdly, the amplitude of the pulse may be continuously monitored.

These attributes of the system may be used as the basis for utilization of a dynamic system of marginal checking having the advantage of continuous and contemporaneous timing, thus eliminating the need for periodic interruptions of data transmission for preventive maintenance purposes.

The amplitude modulated type of representation, as heretofore noted, is asymmetrical and asynchronous, whereas systems using pulse position modulation possess symmetry and synchronism of presentation. Because of these qualities, PPM computing systems incorporating the principles herein disclosed lend themselves to greater flexibility in the establishment of any desired logical design for data transmission or for computer applications.

These and other characteristics of the invention will become more apparent as the description progresses, reference being had to the accompanying drawings wherein:

Fig. 4 is a schematic diagram indicating a method of converting pulse patterns of the PPM type to double line (two wire) representation;

Figure 11:
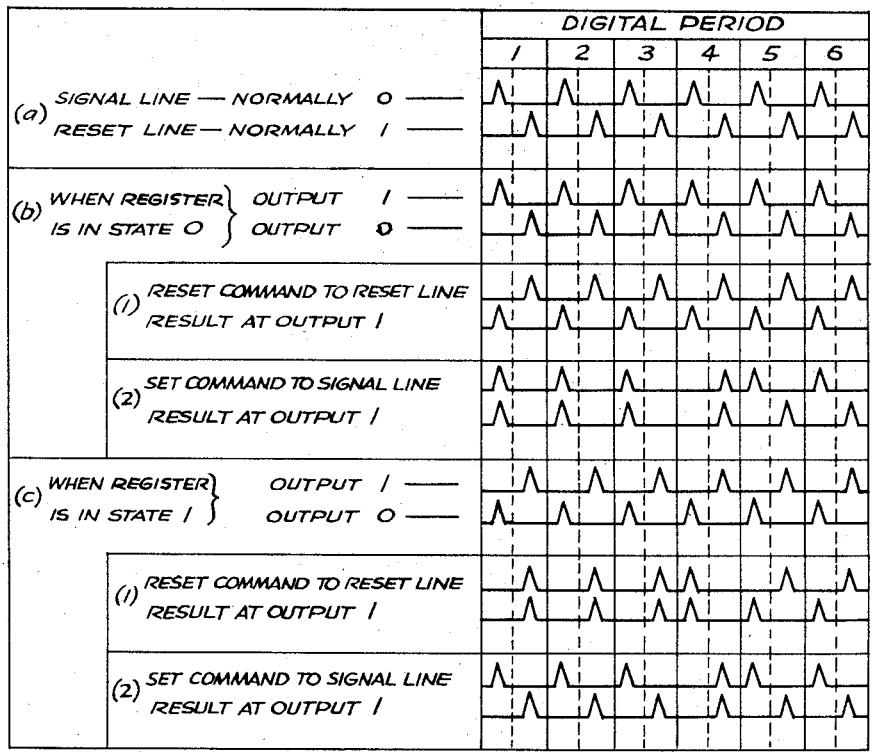
Figure 12:
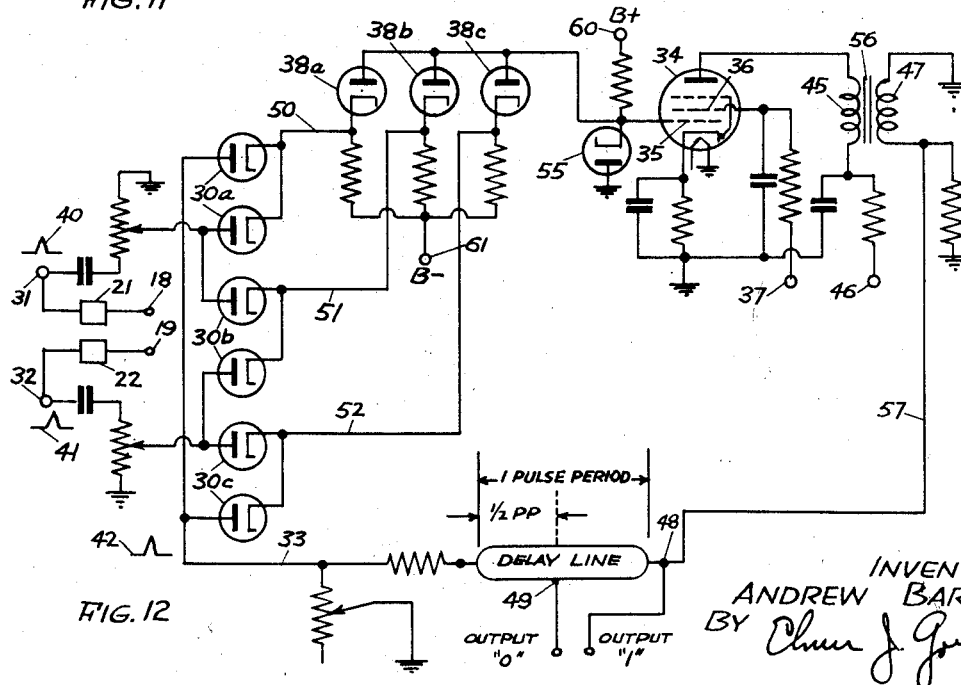
Figure 13:
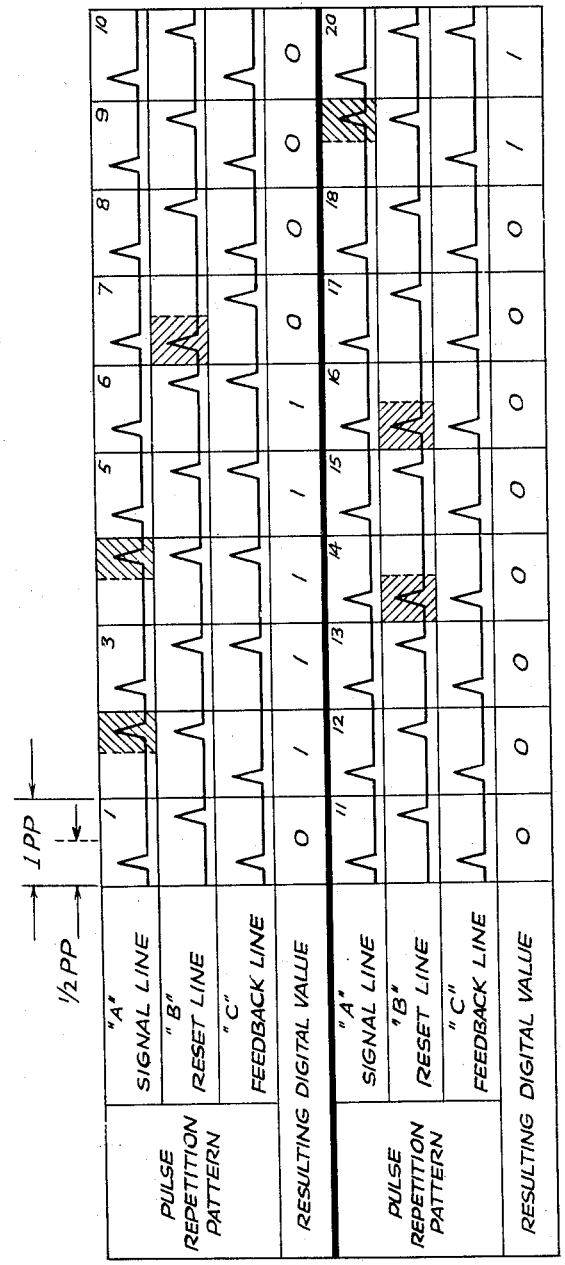

Figs. 5 to 8, inclusive, show the symbols and circuitry for certain components;

Fig. 9 is a schematic representation of a PPM storage unit suitable for incorporation into a computing apparatus embodying the invention;

Figs. 10, 11, and 13 are charts indicating the pulse patterns produced in the operation of the storage unit of Fig. 9;

Fig. 12 is a diagram of electrical connections and components involved in the operation of a storage unit of the character indicated in Fig. 9; and Figs. 14, 15, and 16 are symbolic representations of apparatus arrangements for applying the invention to various computing functions.

Figure 1:
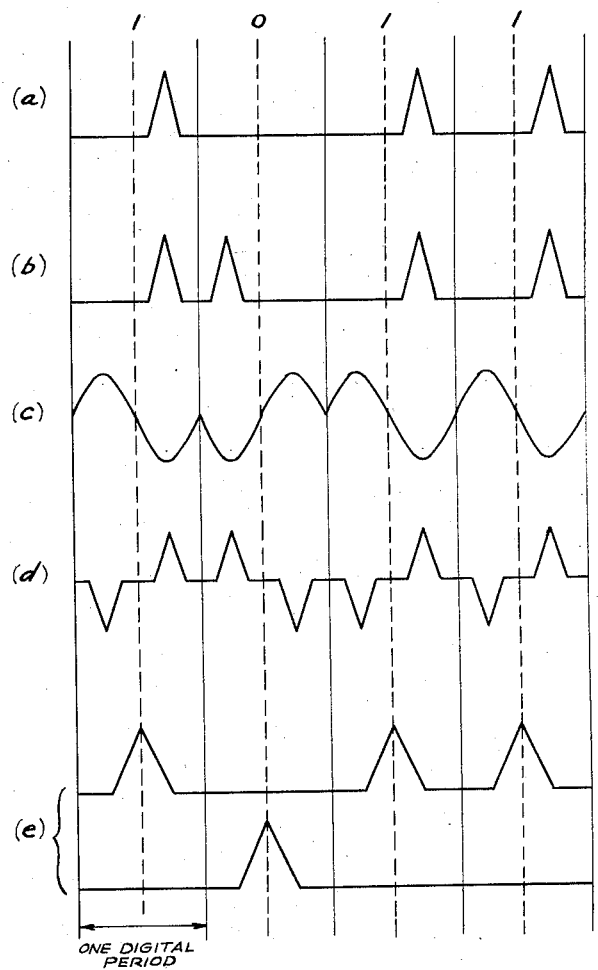
Fig. 1 is a graph illustrating several different pulse and wave patterns representing a particular number in binary code; pattern "a" being the conventional PAM pattern, and patterns b, c, d, and e being derived in accordance with the principles of the present invention.

In Fig. 1, the upper pulse pattern designated by reference numeral a indicates the character of the representation of data being transmitted by the conventional pulse amplitude modulation method, while the pulse pattern designated by the reference numeral b corresponds to that produced in the transmission of intelligence by the pulse position modulation method herein disclosed. In comparing these two patterns, a and b, it will be observed that in pattern a, a pulse occurs only within those digital spacing periods during which a particular digital value is being transmitted. In the arrangement illustrated, these pulse representations appear only when the binary value "1" is being transmitted, there being an absence of any pulse representation during those periods when the binary value "0" is being transmitted. For this reason, there is a lack of uniformity in the spacing between successive pulse occurrences and this, in turn, necessitates the utilization of a relatively wide segment of the full frequency spectrum over which radiant energy may be transmitted in order to have the required pulse available for application at the time of occurrence of the next succeeding pulse representative of a binary value of "1." With the herein-disclosed system of pulse transmission as indicated by pattern b, on the other hand, there is a pulse repetition for every successive time interval representing an even division of the transmission cycle, so that the pulse repetition rate is constant and uniform, with the only variation being confined to the relative positioning within a given pulse period. Thus, for example, while the first, third, and fourth pulses indicated in pattern b are shown as occurring during the second half of their respective time intervals, the second pulse indicated is shown as occurring during the first half of its time interval; this half-interval relative displacement operating to distinguish a pulse of "0" binary value from those of "1" value. Notwithstanding this half-interval relative displacement of certain pulses there is, nevertheless, a uniformity and constancy in the pulse repetition rate; that is, there is a transmission of the same number of pulses during each second of operation of the intelligence transmission cycle. Because of this uniformity and constancy of pulse transmission, the problem of energy generation and frequency selection is greatly simplified and only a narrow band of the frequency spectrum is required to be utilized.

The representation at Fig. 1c indicates a sine wave pattern embodying the principle of pulse position modulation herein disclosed; the pattern indicated in Fig. 1c being the equivalent of that indicated in Fig. 1b in that it serves to transmit the same binary code information as is represented in Fig. 1b, except that the representation is converted to sine wave form, with the direction of the voltage gradient in the representative portions of each successive pulse period serving to indicate the binary digital value "0" or "1" as the case may be. The same is true of Fig. 1d except that the since wave representation of Fig. 1c is inverted and the successive wave loops are shaped to correspond to the pulse peak form indicated in pulse patterns a and b.

Fig. 1e embodies the pulse position modulation principle herein disclosed by representing the two distinguishing digital values by means of a two-wire system wherein one wire carries the pulses representing one binary digital value and the second wire carries the pulses representing the other binary digital value. Here again it will be observed that a pulse occurs along one wire or the other for every time interval of the transmitting cycle so that the total number of pulses transmitted is uniform during every time interval although the number of pulses transmitted over one wire may differ from that transmitted over the other to the extent that the data being supplied may involve utilization of more units of one denomination than the other. In this connection, it should be noted that although the invention is illustrated in Fig. 1 as applied to a binary system of intelligence transmission, the same principles may be incorporated in any computing system of the digital type employing two or more distinguishing digital values. Thus, for example, if applied to a digital computing system employing five distinguishing digital values, the only difference would be that each successive digital period would be divided into five segments rather than the two segments of division which are indicated in the various patterns represented in Fig. 1, and successive pulses would occur in one or another of said five segments, for each successive pulse period, depending upon the particular digital value to be transmitted at each successive time interval.

An important feature of PPM computing, as herein disclosed, is the ease of conversion as between PAM and PPM segments of a complete computing system, in situations where both methods of data presentation are juxtaposed in a continuous computing aggregation.

Figure 2A:
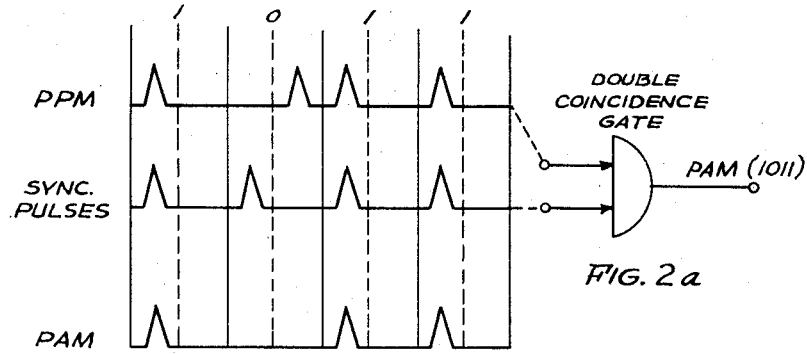
Figs. 2a and 2b are respectively schematic representations of electrical components suitable for conversion in one direction or the other, as between pulse patterns of the amplitude modulation type (PAM) on the one hand, and pulse position modulated patterns (PPM) illustrative of the present invention on the other.

Figs. 2a, 2b, 3, and 4 illustrate two-way conversion arrangements for use in connection with computer circuitry. Fig. 2a indicates a method for converting from PPM computing to PAM computing by use of a "double coincidence gate," operating to pass or block successive PPM pulses according to whether they do or do not have time coincidence with synchronous pulses sent out by a conventional "clock" circuit at equally spaced intervals. The gate unit (more fully described hereinafter) in the example shown in Fig. 2a will function to pass pulses during the first, third, and fourth digital (time) periods (see the final pattern in Fig. 2a) indicative of the binary number –1–0–1–1 in PAM presentation.

Figure 2B:
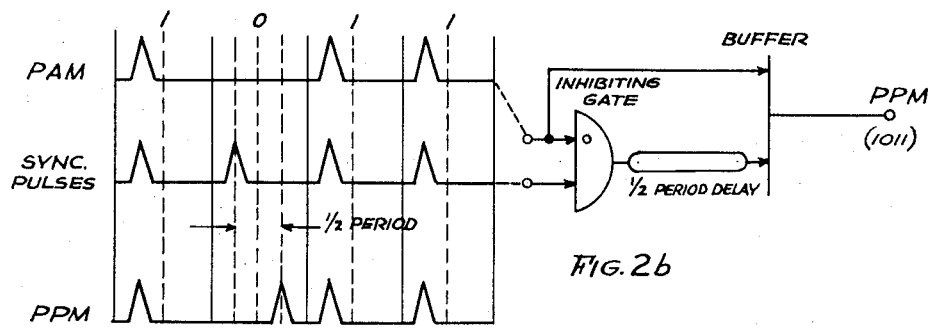

Fig. 2b indicates a method for converting from PAM to PPM presentation by use of an "inhibiting" gate and a delay line; the former operating to pass to the delay line only those synchronous pulses which find no time coincidence with a PAM pulse, and the delay line functioning to produce a one-half period time displacement of certain pulses only, to bring about the PPM result shown in the final pattern of Fig. 2b.

Figure 3:
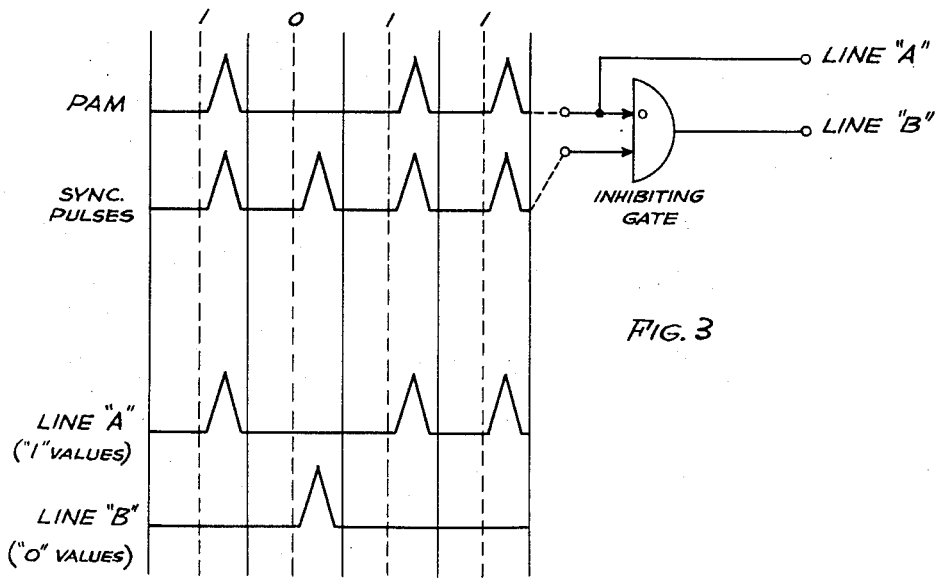
Fig. 3 is a diagram of electrical connections useful for converting pulse patterns of the amplitude modulation type to double line (two wire) representation involving parallel pulse train transmission.

Figs. 3 and 4, respectively, show conversion of PAM and PPM presentations to dual wire presentations designated "Line A" and "Line B" and having the respective pulse patterns indicated in said figures. Here again synchronous pulse inputs and gates (more fully explained hereinafter) are employed.

In the PPM representations of Fig. 1b and Fig. 4, the "1" pulse value is arbitrarily shown as occurring during the second half of a pulse period, whereas the "0" value occurs during the first half in the patterns assumed in Figs. 2a and 2b. The choice of either of these arrangements is, of course, optional and the mode of operation is the same for either arrangement.

Referring now to a radix two or binary computing system, the following functions are normally included:

(1) The "and" function—implemented by a circuit which produces a "1" output only if all of its inputs are "1's" and otherwise produces a "0" output.

(2) The code "or" function—implemented by a circuit which produces a "0" output only if all of its inputs are "0's" and otherwise produces a "1" output.

(3) The storage of an information "bit"—that is, a digital combination representing a coded word or operation.

Figs. 5 and 7 show block symbols representative of "buffer" and "gate" components, respectively, which may serve as pulse blocking and pulse basing means in the PPM mode of computing, herein disclosed. Figs. 6 and 8 show electrical circuits incorporating these buffer and gate functions, respectively. Fig. 9 is a block diagram of a dynamic type of flip-flop adapted to operate as a storage register for PPM pulses by utilizing buffer and gate components such as are shown in Figs. 5 to 8, inclusive. The complete electrical connections for a single storage unit are shown in Fig. 12; Figs. 10, 11, and 13 show the results in chart form. In Fig. 12, the storage circuit illustrated is adapted to receive a "1" or "0" binary code signal pulse each time there is a change in the condition of coincidence or lack of coincidence as between (a), a position modulated input pulse (40 or 41) entering the buffer diode group 30 by way of terminal 31 or 32, as the case may be, and (b) the contouring feedback pulse 42 entering the buffer group by way of line 33; it being understood that the feedback pulses, as well as both position modulated pulses have the same repetition rate of $n$ pulses per second but that either pulse 40 or 41 may be shifted one-half a digital period, in time sequence, by the action of phase shifters 21 and 22 interposed between pulse sources 18 and 19 on the one hand and buffer terminals 31 and 32 on the other. Amplifier 34 has a first control grid 35 responsive to the signal derived from the position modulated pulse input, and a second control grid 36 responsive to the amplitude correcting synchronous pulses entering the circuit from source 37. The diode group 38 is herein referred to as a "two out of three coincidence gate" by reason of its mode of operation. That is, when time coincidence occurs as between pulses 40 and 42 (indicating that the position modulated pulse is in the relative position constituting the signal position and therefore receivable through signal line 31), the upper buffer diode pair 30a becomes self-blocking because of the mutual buffering action of the signal and feedback pulses, respectively; but the other two buffer output lines 51 and 52 will be effective to conduct the pulse energy to the coincidence gate diodes 38b and 38c so that only the coincidence gate diode 38a remains conductive (condition No. 1, as shown in Fig. 10). Accordingly, the control grid 35 is effective to cause the tube 34 to conduct, and current will flow in transformer primary 45, forming part of the plate circuit of tube 34, the current source being shown at 46. This, in turn, results in current flow in transformer secondary circuit 47. The result will be the entry of a binary code signal in the storage register connecting with output terminals 48 and 49.

On the other hand, if there is an absence of a signal pulse 40 at the time of occurrence of a given feedback pulse 42—that is, if the position modulated pulse is a "reset" pulse 41 occurring at ½ P position displacement with respect to the normal spacing of said pulse (the symbol P representing the full digital period spacing)—there will be a lack of coincidence as between the pulses 40 and 41 on the one hand and the feedback pulse 42 on the other, but there will be coincidence between the pulses 40 and 41. Hence, the middle buffer diode group 30b will remain in the mutually blocking relationship but the upper and lower buffer output lines 50 and 52 will conduct, hence the condition of the coincidence gate group 38 will be as shown in line No. 5 of Fig. 10, and the tube 34 will continue to conduct, but there will now be a one-half period time displacement in the arrival of the output pulse at terminal 48, hence a change in the storage register from the previous input digital value "zero" or "one" (as the case may be) and the entry of the opposite digital value representing the new information bit to be recorded.

A study of Figs. 9 and 12 will show that the coincidence gate structure illustrated therein will emit a pulse whenever a coincidence of pulses occurs on any two (or for that matter three) of its inputs, which inputs are, respectively, the signal line A, the reset line B and the delayed positive feedback C. The operation of this storage register is illustrated by the charts shown in Figs. 10, 11, and 13.

Referring to these charts, and particularly to Fig. 13, digital period No. 1 shows the normal or "steady" state relationship of pulses at A, B, and C. During such steady state a "0" is stored since the feed back pulse (normally at "0" time) coincides in time with the "set" pulse A of "0" significance. Now let it be assumed that in digital period No. 2 a "set" pulse, representative of a "1" value, occurs on the signal line A. As this coincides with the normal "1" pulse on reset line B, it produces an output pulse during the "1" half of period No. 2, but produces no pulse during the "0" half of the period since no "0" pulse is present on either the A or the B line at that half period time. Hence a "1" value is registered for period No. 2.

Proceeding now to digital period No. 3, the A and B pulses occur in their normal sequence. As a result of the new command in period No. 2, the feedback pulse is now displaced from its normal "0" time position to the "1" position, where it now coincides with the normal "1" on reset line B. Therefore, the storage register continues to record a "1" value which is maintained throughout the succeeding periods 4, 5, and 6. Subsequently, if it be assumed that at period No. 7 a reset command occurs, shifting the normal reset pulse time to the "0" time position, the next feedback pulse will return to the "0" position and a new "0" value will enter the register.

The "set" command shown as occurring at period No. 4 does not change the digital value being registered at that time, as the "1" value is already set in the register. Similarly, the reset command occurring in periods Nos. 14 and 16, when the register is standing in the reset position, does not shift the register. Such shift will occur only upon receipt of the next set command. Such a new set command is shown as occurring in period No. 19 of the Fig. 13 chart, and it brings about a register shift to the "1" value in said period No. 19.

Referring again to Fig. 12, the manner in which the respective input pulses entering the circuit from either the signal line or the reset line are affected by the pulses entering the "buffer" diode group "30" by way of the feedback line, and by each other, has been indicated above, but will now be described in greater detail. The input voltage (from source 61) to the "coincidence gate" diode group 38 is negative with respect to the B+ voltage entering from source 60, so that all diodes of the gate group 38 are adapted to conduct current in the direction from 60 to 61 in the absence of input pulses entering by way of one or more of the lines 50, 51 and 52. The grounded diode 55 operates as a clamping diode. When a signal pulse is applied to any one of the input lines 31, 32, or 33, the buffer diode of the 30 group next adjacent to said line is thereby cut off and the diode directly in said line thereupon operates to conduct current to a greater degree than previously. On the other hand, both diodes of a pair in the "30" group are cut off when both receive inputs concurrently. Thus, for example, with 30a and 30b being mutually blocked (cutoff) no pulse goes through line 50, hence gate diode 38a conducts, in the direction 60 to 61. The Fig. 10 chart indicates that the latter condition rarely occurs at more than one of the "30" diode pairs at any one time. In any one of the conditions 1 to 6, inclusive, tabulated in Fig. 10, there is a condition of matching voltages in at least two of the three coincidence gate diode circuits 38 and this matching condition (which cuts off current flow through such diodes) will assure maintenance of the proper potential in the circuit to grid 35 of the tube 34 for the duration of the prevailing pulse period, whether the pulse is entering the circuit by way of the signal line or the reset line. Each pulse amplified in the tube circuit 34 in this manner will produce a corresponding pulse at the output terminal 48 leading to the counting register, the path of pulse transmission including the plate circuit of the tube 34, the primary and secondary windings of the transformer 56 and the conductor 57 in the secondary circuit of the transformer. Each pulse thus delivered to the register circuit will be recorded in the register circuit as a "0" or "1" digital value depending upon whether the pulse originated at the signal line or the reset line, and upon whether its relative position within its pulse time period has or has not been shifted by the interaction of the feedback pulse which is mixed therewith if the two pulses have time coincidence at the mixing diode group 30.

The eight possible combinations of pulse relationships which may occur during any successive half period time interval, and the effect of each such possible combination upon the diodes 38a, 38b and 38c, are presented in the chart designated as Fig. 10 in the drawings. From this Fig. 10 chart it will be seen that under any one of the first six conditions charted, there is a "blocked" path through some two of the three diodes constituting the coincidence gate. Because of this "two out of three" coincidence (which clears only diode 38a under each of two conditions indicated in the foregoing chart, only diode 38c under each of two other conditions indicated in the chart, and only diode 38b under each of the other four indicated conditions) the voltage available at grid 35 remains substantially constant, hence the tube 34 receives substantially constant excitation potential from source 60 by way of the circuit to grid 35. In other words, the grid circuit receives one pulse for each full period interval, and such pulse may be received in the first or second half of the pulse period—that is, a first half period pulse from the signal line, may be accompanied or followed by a first or second half period pulse from the reset line, and a second half period pulse from the signal line may be accompanied or preceded by a second or first half period pulse from the reset line. Dependent upon which of these combinations occurs, there will be one, and only one, pulse delivery to output 1 (terminal 48) for each full pulse period, and this delivered pulse will register a "zero" or "one" digital value, as the case may be, in accordance with whether the pulse arrival at output 1 is in time coincidence with the first half or the second half of the time interval period.

Should condition No. 7 or No. 8 (Fig. 10) occur (as assumed at period No. 4, Fig. 13) all diodes 38 conduct and the grid circuit is momentarily inactive; but this would normally be followed by a reversion to condition No. 3 (as assumed at period No. 5, first-half, Fig. 13) whereupon tube conduction resumes, with the value "1" remaining in the register, as heretofore explained in the discussion of Fig. 13.

A description follows with reference to gating circuitry for implementing logical computing functions in connection with the aforesaid PPM storage device.

In the PPM concept of computing as herein disclosed and developed, the two signal input lines A and B (see Fig. 14) serve as the vehicles for feeding into the computer two continuous trains of "clock" pulses of the same frequency, but differing in phase by 180 degrees. These two clock pulse trains (herein referred to as "$C_1$" and "$C_2$") serve to define and distinguish the "1" and "0" positions in each digital period. Using these clock pulse trains, an "and" circuit for two variables, A and B, may be implemented as shown in block diagram form in Fig. 14.

Inspection of Fig. 14 reveals that gate No. 1 will emit a pulse at "1" time in the cycle provided both A and B are coincident at the "1" time point, and will emit a pulse at "0" time if A and B coincide at the "0" time point. If A and B do not coincide, gate No. 1 will emit no pulse, but gate No. 2 will emit a pulse at "0" time.

Thus, the final output will consist of "0" pulses unless both A and B are coincident at the "1" position, in which case the final output will be a "1" pulse.

If, in Fig. 14, $C_0$ is replaced by $C_1$, the output will consist of "1" pulses unless both A and B are coincident at the "0" position, in which case the final output will be "0" value. Thus the circuit operates to register an "or" function, whereas the entry of a "1" value discharges an "and" function. In other words, the same arrangement of parts will perform either an "and" or an "or" function, depending upon which clock phase is the coincidence locus.

The implementing of other functional tasks may be accomplished by adding a third leg to gate No. 1 of Fig. 14, as illustrated in Fig. 15. Addition of this gate leg will not alter the output of gate No. 1, since it merely prevents gate No. 1 from passing a "0" pulse when A and B are both in the "1" position. In this situation gate No. 2, however, passes a "0" pulse, since the latter gate finds coincidence of A and B at the "0" position; hence the final output is affected by the addition of this third leg.

In Fig. 15 the symbols P and $\bar{P}$ (corresponding to $C_1$ and $C_0$) represent the assertion and the negation, respectively, of a variable, P. Other symbols commonly used in conventional PAM computers may be utilized in analogous fashion in PPM computing as herein disclosed. Examples of these are the dot (.) for "and," the vel ($v$) for "or," and the bar (−) over a variable letter for "not." The implications of these symbols can best be clarified by examples. Thus the equation $f=A.B$, as developed by the arrangement indicated in Fig. 15, is to be read: $f$ is "1" if A is "1" and B is "1." Again, the equation $f_1=(A.B.C)$ $v$ $(A.\bar{B}.\bar{C})$ $v$ $(\bar{A}.B.\bar{C})$ $v$ $(\bar{A}.\bar{B}.C)$ as developed by the arrangement indicated in Fig. 16, is to be read: $f_1$ is the sum of A, B and C when all three are of "1" value, or the sum of A, B and C when A is "1" and B and C are each "0," or the sum of A, B and C when B is "1" and A and C are each "0," or the sum of A, B and C when C is "1" and A and B are each "0." In these summations $f_1$ is to be read as one of two functions, $f_1$ and $f_2$, each representative of A.B for the "and" function, and AvB for the "or" function.

Any circuit which will perform these or related functional tasks in a conventional PAM system will perform them equally well in a system operating in accordance with the PPM principles herein disclosed. Additionally, systems incorporating PPM have the distinguishing advantage of the inherent capacity to distinguish automatically between the normal representation of "0" on the one hand, and a component failure on the other. That is to say, with a PPM-controlled system a component failure will reveal itself instantly for what it is, namely, a component failure; with PAM systems, on the other hand, a component failure can disguise itself as being merely the normal representation of "0" in such a system.

With computing circuits arranged to incorporate PPM as herein disclosed, every single component failure will reveal itself instantly in one or the other of the following ways:

(1) By introducing two pulses in a single digital period; or (2) By showing no pulse for a digital period.

From this it follows that a checking circuit which tests whether there is one, and only one, pulse in every digital period, constitutes a sure and positive check upon the accuracy of the computations produced. Several such checking circuits have been devised, and have been found to operate successfully in actual practice.

The constant duty characteristic of the PPM pulse trains as herein disclosed makes it possible to monitor the signal level at any point with simple indicating devices such as meters or relays; hence it is relatively easy to maintain a continuous check upon the efficiency of the tube circuits. Thus, not only failures of components but also the weakening of a component is readily ascertainable, so that replacements of weakening components can be accomplished before any actual errors in computation have occurred.

It will also be apparent that with computing apparatus incorporating the PPM principles herein disclosed, a single logical circuit can perform a multiplicity of functions by appropriate application of the clock pulses, $C_1$ and $C_0$, to the input legs of the gate and buffer components. This adaptability of the components to varying logical requirements makes it possible to reduce the over-all circuitry as compared with equivalent systems operating upon conventional PAM principles.

In addition to the above-described characteristics inherent in computation by the PPM method herein disclosed, the following features should be noted:

(1) The direct current level is substantially constant.

(2) There are no significant frequency components below the basic clock frequency.

(3) Signal circuits may be effectively decoupled with small R. C. networks.

(4) Very few, if any, differing direct current supply voltages will be required.

(5) Since they can readily be by-passed, cathode screen and decoupling resistors may be made as large as desired, thus providing direct current degeneration.

(6) Coupling through small capacitors and simple pulse transformers is possible, independently of resort to auxiliary circuits.

(7) Uniform pulse amplitudes may be maintained, even with wide variations in the characteristics of component tubes.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. A system for transmitting intelligence in code form comprising means for transmitting signal energy in the form of pulsations occurring at a constant repetition rate of $n$ uni-polar pulses per time interval and means for shifting the relative position of a particular one of said pulses within its particular time interval in relation to the preceding pulse so that said shifted pulse will present a component of the applicable code other than the component represented by said preceding pulse, where $n$ represents the total number of pulses occurring within said time interval, means for feeding said coded intelligence to a coincidence gate provided with a feedback path having a fractional pulse period delay to one input of said coincidence gate.

2. A system for transmitting intelligence in the form of a counting code utilizing two or more significant digits to represent distinguishing data components, said system comprising timing means for transmitting signal energy pulses of uniform polarity at uniformly spaced intervals to produce $n$ digital representations for each successive time of interval, and means for varying the time of occurrence as between successive pulses in each total of $n$ pulses to cause successive totals of $n$ pulses to produce different code representations within its time interval, with the degree of difference between successive code representations being dependent upon the degree of variation in the spacing of individual pulses comprising each successive total of $n$ pulses, where $n$ represents the total number of pulses occurring within said time interval, and means for feeding said coded intelligence to a two-out-of-three coincidence gate provided with a feedback path having a fractional pulse period delay connected to one input of said coincidence gate.

3. A system for transmitting intelligence in binary code form comprising means for sending signal energy pulses of uniform polarity at the rate of $n$ pulses per second, which total of $n$ pulses remains constant for each succeeding second of the transmission cycle, and means for causing the code representation resulting from said pulse transmission to vary from second to second in accordance with the degree by which the spacing of individual pulses in one group of $n$ pulses diverts from the relative spacing of the individual pulses in a succeeding group of $n$ pulses, where $n$ represents the total number of pulses occurring within each second, means for feeding said energy pulses to a coincidence gate provided with a feedback path having a fractional pulse period delay to one input of said coincidence gate, and means for extracting said signal pulses at timed intervals along said delay line.

4. The method of transmitting intelligence in the form of pulses representing digits in a numerical code, which comprises the step of causing pulses of uniform polarity to occur at intervals whose maximum length in lapsed time, between the completion of one pulse and the commencement of the succeeding pulse, is always less than $$\frac{2}{n}$$

seconds, where $n$ represents the total number of pulses occurring each second, and applying said pulses to a coincidence gate having a feedback delay path to one input of said coincidence gate.

5. A system for transmitting intelligence in the form of pulses of uniform polarity representing digits in a numerical code, comprising means for causing the pulses to occur at a constant rate of $n$ pulses per second, but with spacing variations as between successive pulses in each group of $n$ pulses, said spacing variations being representative of different digits of said numerical code, means for limiting the magnitude of said spacing variations to a time interval ranging between a minimum of zero and a maximum of $$\frac{2}{n}$$

seconds, where $n$ represents the total number of pulses occurring each second, and means for applying said pulses to a coincidence gate having a feedback delay path connected in the input of said coincidence gate.

6. A digital storage circuit for storing intelligence in the form of pulses of uniform polarity representing digits in the binary code, comprising means for causing successive pulses to occur during either the first or the second portion of a time interval, depending upon the particular binary digit to be represented, means for producing a second pulse during either the first or the second portion of an equal time interval occurring immediately after said first-named time interval, and means for feeding pulses to a binary storage device including a pulse delay line and a feedback circuit connected thereto for performing logical computer functions.

7. A digital storage circuit for storing intelligence in the form of pulses of uniform polarity representing digits in a numerical code, comprising means for sending $n$ pulses during each second of the intelligence transmitting cycle, means for causing each of said pulses to occur during a time interval whose length is exactly $$\frac{1}{n}$$

seconds but whose time of occurrence is variable within said time interval of $$\frac{1}{n}$$

seconds by an amount representative of a particular digit of said numerical code, means for limiting the spacing between successive pulses to a maximum which is always less than $$\frac{2}{n}$$

seconds, where $n$ represents the total number of pulses occurring each second, and means for feeding said pulses to a storage register circuit having a feedback delay circuit for controlling the introduction of said pulses into said storage register.

8. A digital storage circuit for storing intelligence in the form of pulses representing the digits "1" and "0" of a binary code, comprising a pair of pulse input lines, each delivering pulses at the same uniform repetition rate, with the pulses transmitted through one line having a one-half pulse period time displacement with respect to the pulses transmitted through the other line, means for shifting a selected pulse of one line into time coincidence with the companion pulse of the other line, delay line output means responsive to said shifting means for causing registration of one or the other of said digital values during each pulse period in accordance with the effect produced by said shifting means upon said last-named means, and feedback means connected to said delay line output means and said pulse input line for controlling the introduction of input pulses into said storage register.

9. A digital storage for storing intelligence in the form of pulses representing distinguishing symbols of a multi-symbol code, comprising a plurality of pulse input lines, a plurality of diode buffer elements arranged to receive the pulses delivered by said pulse input lines, a plurality of coincidence gates adapted to receive the output of said diode buffer elements, pulse output means responsive to the coincidence relationships prevailing at said coincidence gates at each pulse period to register one or another of said symbols for each pulse period, said pulse output means including a delay line and means for shifting successive pulses within the limits of a single pulse period to control a feedback circuit between said output means and said diode buffer elements the coincidence relationships at said coincidence gates.

10. A digital storage circuit for storing intelligence in the form of pulses comprising a pair of pulse input lines each delivering pulses at a uniform repetition rate to a plurality of buffer elements, coincidence gate means adapted to receive and emit a pulse in response to the pulse output of one or both said lines and said buffer elements, pulse output registering means including a delay line responsive to the coincidence relationship established at said coincidence gates in each successive pulse period, means for shifting a particular one of said pulses into time coincidence with the companion pulse transmitted through the other of said input lines, means responsive to the resulting change in the coincidence relationships at said coincidence gates for modifying the position of said pulse in said pulse output registering means, and feedback means connected in circuit with said pulse output registering means and said buffer elements to control the transmission of said pulses from said buffer elements to said coincidence gates.

11. A system for transmitting intelligence in the form of pulses comprising a pair of pulse input lines each delivering pulses at the same uniform repetition rate of N pulses per second, with the pulse delivery through one input line being normally in $$\frac{1}{2N}$$

time displacement with respect to the time delivery through the other input line, coincidence gate means adapted to receive the pulse output of both said lines, pulse output registering means including a fractional pulse period delay line responsive to the coincidence relationship established at said coincidence gates in each successive pulse period, means for shifting a particular one of said pulses into time coincidence with the companion pulse transmitted through the other of said input lines, and means responsive to the resulting change in the coincidence relationships at said coincidence gates for modifying the operation of said pulse output registering means, said last-named means including pulse feedback means interposed between said pulse output registering means and said coincidence gates for interaction with said pulse input means to control the effect of said pulse shifting means upon said coincidence gates, said last-named means further including pulse delay means for producing a fractional pulse period delay in the transmission of a feedback pulse to said coincidence gates.

12. A digital storage circuit for storing intelligence in the form of pulses comprising a pair of pulse input lines each delivering pulses at the same uniform repetition rate of pulses per time interval, with the pulse delivery through one input line being normally a fraction of the time displacement with respect to the time delivery through the other input line, coincidence gate means adapted to receive the pulse output of both said lines, pulse output means responsive to the coincidence relationship established at said coincidence gates in each successive pulse period, pulse input shifting means for shifting a particular one of said pulses into time coincidence with the companion pulse transmitted through the other of said input lines, and means responsive to the resulting change in the coincidence relationships at said coincidence gates for modifying the operation of said pulse output registering means, said last-named means comprising pulse feedback means interposed between said pulse output registering means and said coincidence gates for interaction with said pulse input shifting means to control the effect of said pulse input shifting means upon said coincidence gates, said pulse output registering means also including pulse delay means for producing a fractional pulse period delay in the transmission of a feedback pulse to said coincidence gates, and said last-named means further including buffer diode means interposed between said pulse input lines and said coincidence gates, to modify the effect of said pulse input lines and said pulse feedback means upon said coincidence gates.

References Cited in the file of this patent
UNITED STATES PATENTS

| 2,141,237 | Connery | Dec. 27, 1938 |
| 2,232,082 | Spencer | Feb. 18, 1941 |
| 2,537,056 | Heeppner | Jan. 9, 1951 |
| 2,609,143 | Stibitz | Sept. 2, 1952 |
| 2,679,040 | Gloess | May 18, 1954 |
| 2,700,155 | Clayden | Jan. 18, 1955 |
| 2,700,696 | Barker | Jan. 25, 1955 |